(12) United States Patent
Hornung et al.

(10) Patent No.: US 6,901,868 B2
(45) Date of Patent: Jun. 7, 2005

(54) PLANT FOR THE THERMAL TREATMENT OF MATERIAL AND OPERATION PROCESS THEREOF

(75) Inventors: Andreas Hornung, Karlsruhe (DE); Henning Bockhorn, Pfinztal (DE); Karl Appenzeller, Rosenburg (AT); Carlo Maria Roggero, Turin (IT); Wander Tumiatti, Rosta (IT)

(73) Assignee: Sea Marconi Technologies di Wander Tumiatti S.A.S., Turin (IT)

( * ) Notice: Subject to any disclaimer, the term of this patent is extended or adjusted under 35 U.S.C. 154(b) by 0 days.

(21) Appl. No.: 10/451,018

(22) PCT Filed: Dec. 17, 2001

(86) PCT No.: PCT/EP01/14870

§ 371 (c)(1),
(2), (4) Date: Dec. 18, 2003

(87) PCT Pub. No.: WO02/50484

PCT Pub. Date: Jun. 27, 2002

(65) Prior Publication Data

US 2004/0079262 A1 Apr. 29, 2004

(30) Foreign Application Priority Data

Dec. 19, 2000 (EP) .............................................. 00830831

(51) Int. Cl.⁷ ................................. F27B 7/14; F27B 7/02
(52) U.S. Cl. ....................... 110/246; 110/229; 432/118; 432/106
(58) Field of Search ................................. 110/246, 229; 432/112, 118, 106, 107

(56) References Cited

U.S. PATENT DOCUMENTS

| | | | |
|---|---|---|---|
| 3,618,918 A | * | 11/1971 | Tembe ........................ 432/113 |
| 4,009,667 A | * | 3/1977 | Tyer et al. ................... 110/186 |
| 4,598,831 A | | 7/1986 | Nakamura et al. .......... 215/1 C |
| 4,606,283 A | | 8/1986 | DesOrmeaux et al. ...... 110/250 |
| 4,862,601 A | * | 9/1989 | Baillie .......................... 34/182 |
| 4,993,566 A | | 2/1991 | Eberle ......................... 215/1 C |
| 4,993,567 A | | 2/1991 | Eberle, Jr. ................... 215/1 C |
| 5,141,120 A | | 8/1992 | Brown et al. ................ 215/1 C |

(Continued)

FOREIGN PATENT DOCUMENTS

| | | |
|---|---|---|
| CH | 256598 | 3/1949 |
| DE | 699 448 | 11/1940 |
| DE | 42 37 161 A1 | 5/1994 |
| EP | 0 365 260 | 4/1990 |
| EP | 0 675 748 B1 | 6/1997 |
| GB | 384060 | 12/1932 |
| WO | WO 91/15607 | 10/1991 |

OTHER PUBLICATIONS

Copy of PCT International Search Report dated Feb. 27, 2002 (PCT/EP01/14870).

Method 8280A, The analysis of polychlorinated dibenzo–$p$–dioxins and polychlorinated dibenzofurans by high resolution gas chromatography/low resolution mass spectrometry (HRGC/LRMS), *CD–ROM*, Dec. 1996, *Revision 1*, 1–55.

Method 8290, Polychlorinated dibenzodioxins (PCDDs) and polychlorinated dibenzofurans (PCDFs) by high–resolution gas chromotography/high–resolution mass spectrometry (HRGC/HRMS), *CD–ROM*, Sep. 1994, *Revision 0*, 1–71.

*Primary Examiner*—Kenneth Rinehart
(74) *Attorney, Agent, or Firm*—Woodcock Washburn LLP

(57) ABSTRACT

The plant for the thermal treatment of material, in particular scrap material, comprises at least a reaction zone within a rotary kiln having the longitudinal axis inclined of an angle in the range 0°±45° with regard to an horizontal plane and provided of first heating means and of at least a rotary screw having second heating means. The screw shaft is hollow and has, at least locally, apertures allowing the flow of gas from and/or into the reaction zone, a plurality of thermally conductive particles being movable within the reaction zone.

44 Claims, 5 Drawing Sheets

U.S. PATENT DOCUMENTS

| | | | |
|---|---|---|---|
| 5,141,121 A | 8/1992 | Brown et al. | 215/1 C |
| 5,503,283 A | 4/1996 | Semersky | 215/375 |
| 5,520,877 A | 5/1996 | Collette et al. | 264/521 |
| 5,829,614 A | 11/1998 | Collette et al. | 215/375 |
| 6,267,261 B1 | 7/2001 | Lesage | 220/567.3 |
| 6,372,318 B1 | 4/2002 | Collette et al. | 428/35.7 |
| 6,612,451 B2 | 9/2003 | Tobias et al. | 215/375 |

* cited by examiner

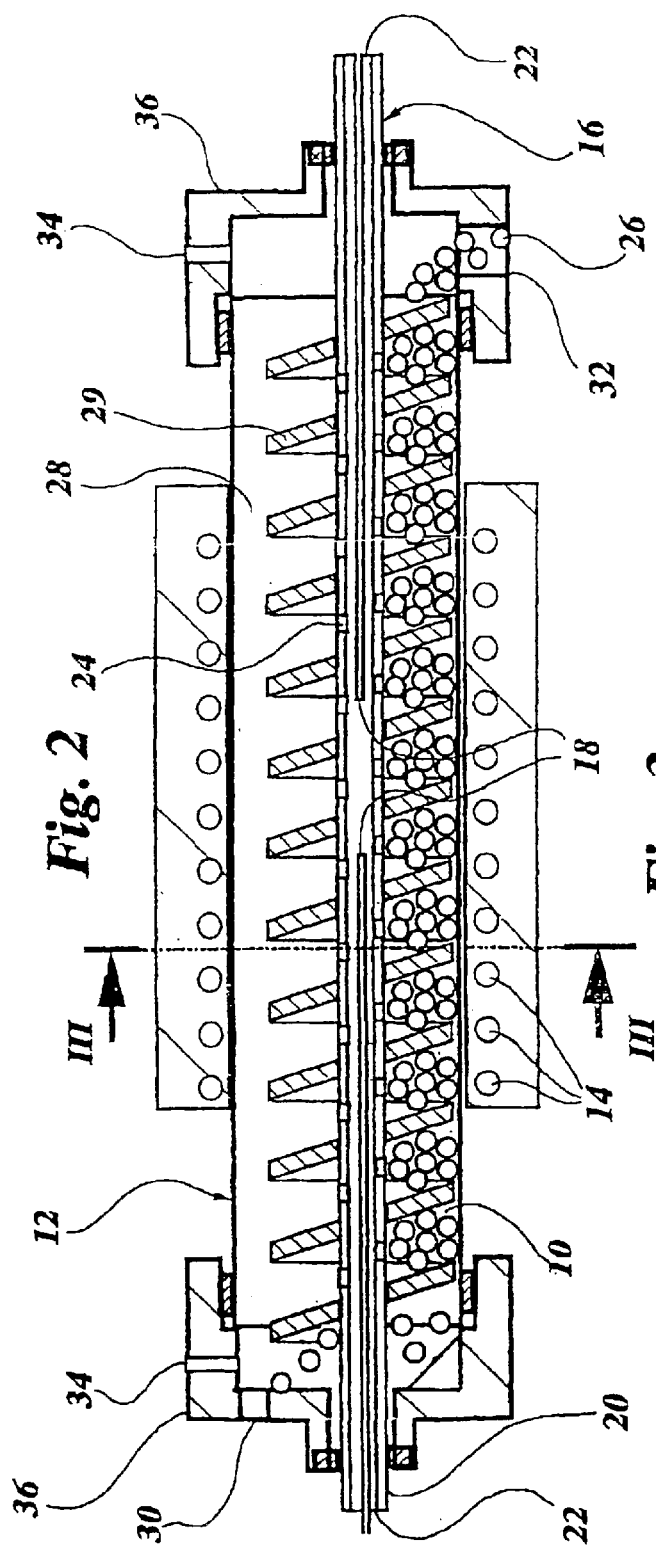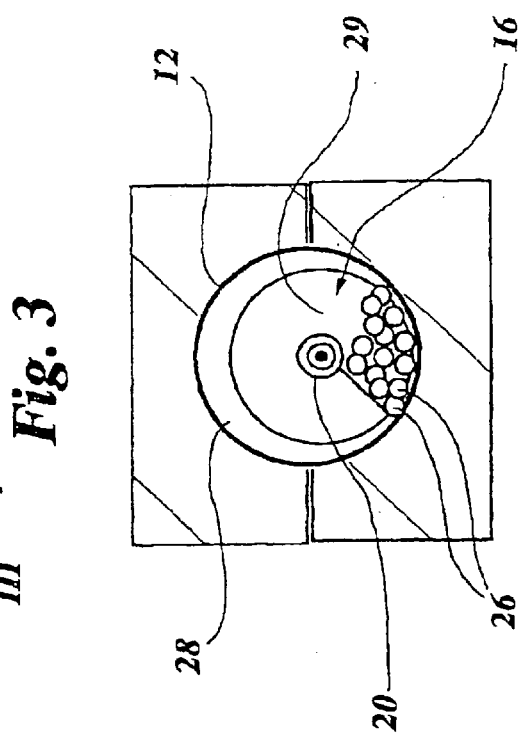

PLANT FOR THE THERMAL TREATMENT OF MATERIAL AND OPERATION PROCESS THEREOF

The present invention relates to a plant for the thermal treatment of material, in particular heterogeneous scrap material, and the relative operation process.

The treatment of heterogeneous scrap material, in particular deriving from electronic industry, is presently highly problematic. Due to the complexity of these materials, their halogen, in particular chlorine and bromine, content and the mixture of duroplastics and thermoplastics, a direct clean conversion is not indeed feasible: in particular neither a conversion in thermal plants, due to the high halogen content, nor a deposition, due to the high costs, are possible.

Manual separation of these scrap materials has hitherto taken place. However these procedures are labor-intensive and are, in any case, of difficult application to highly integrated devices, such as electronic plates and cards containing noble metals, whose recovery is economically interesting.

The object of the present invention is to provide a plant and the relative operation process which allow a suitable treatment of material, in particular the above-mentioned heterogeneous scrap material.

According to the present invention, this object is achieved by means of a plant and the process of operation thereof having the features indicated in any of the following claims.

Figure 1:
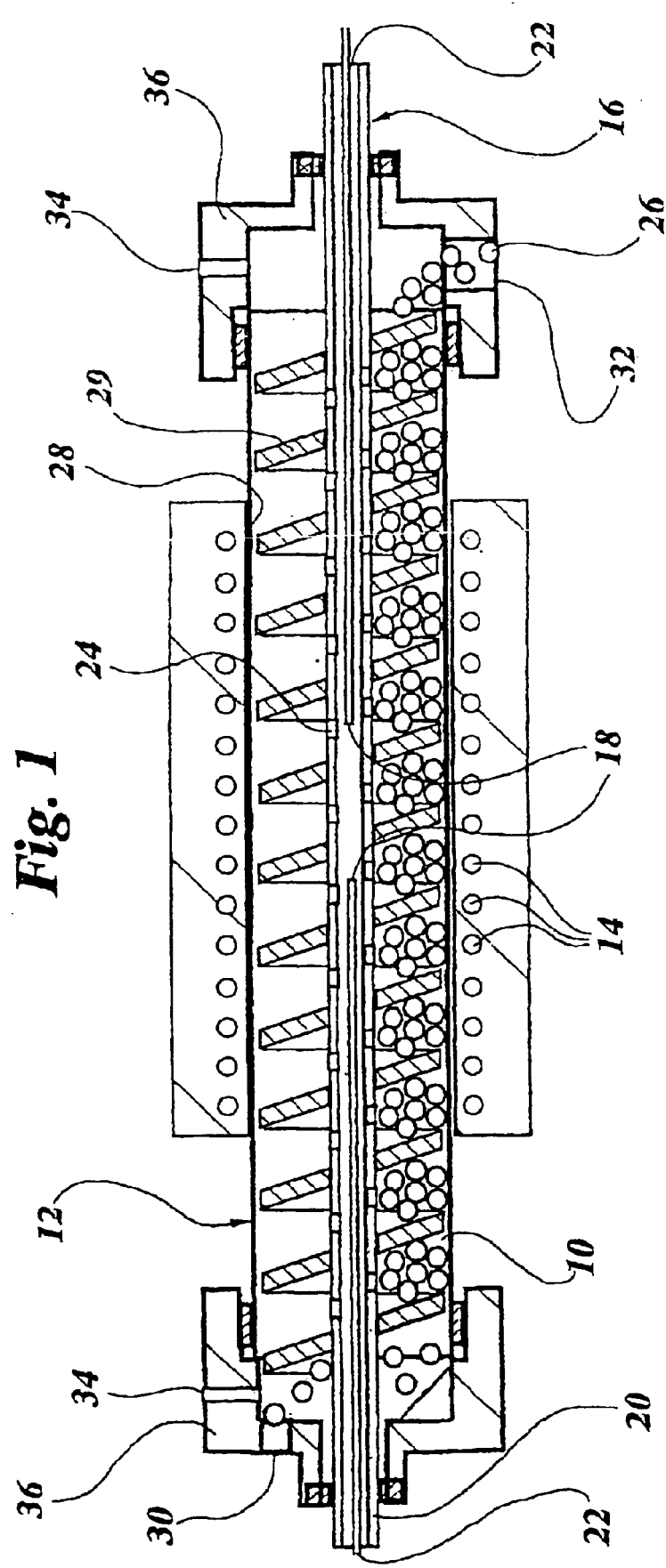
Figure 4:
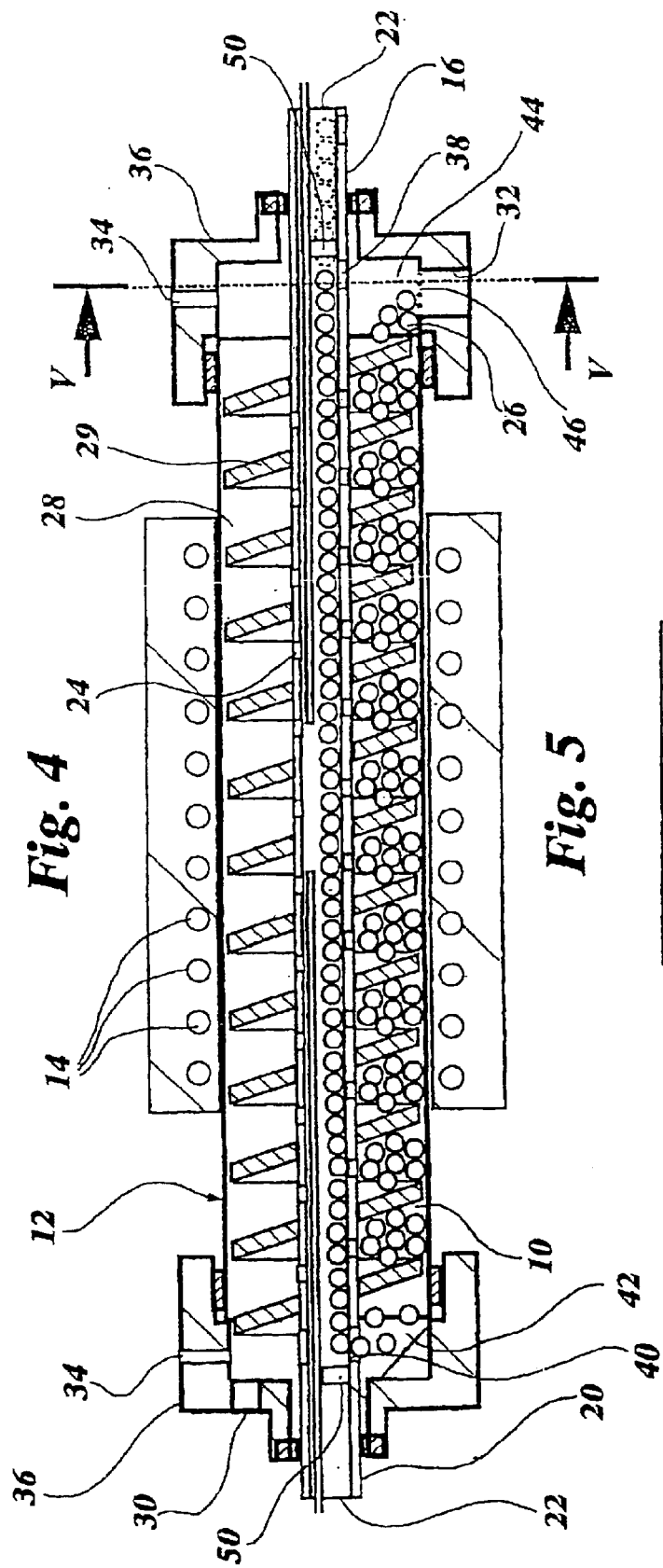
Figure 5:
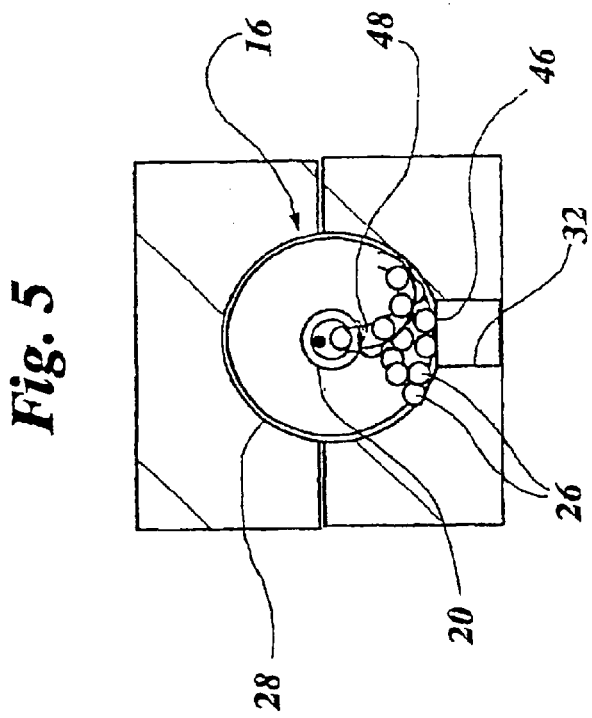
Figure 6:
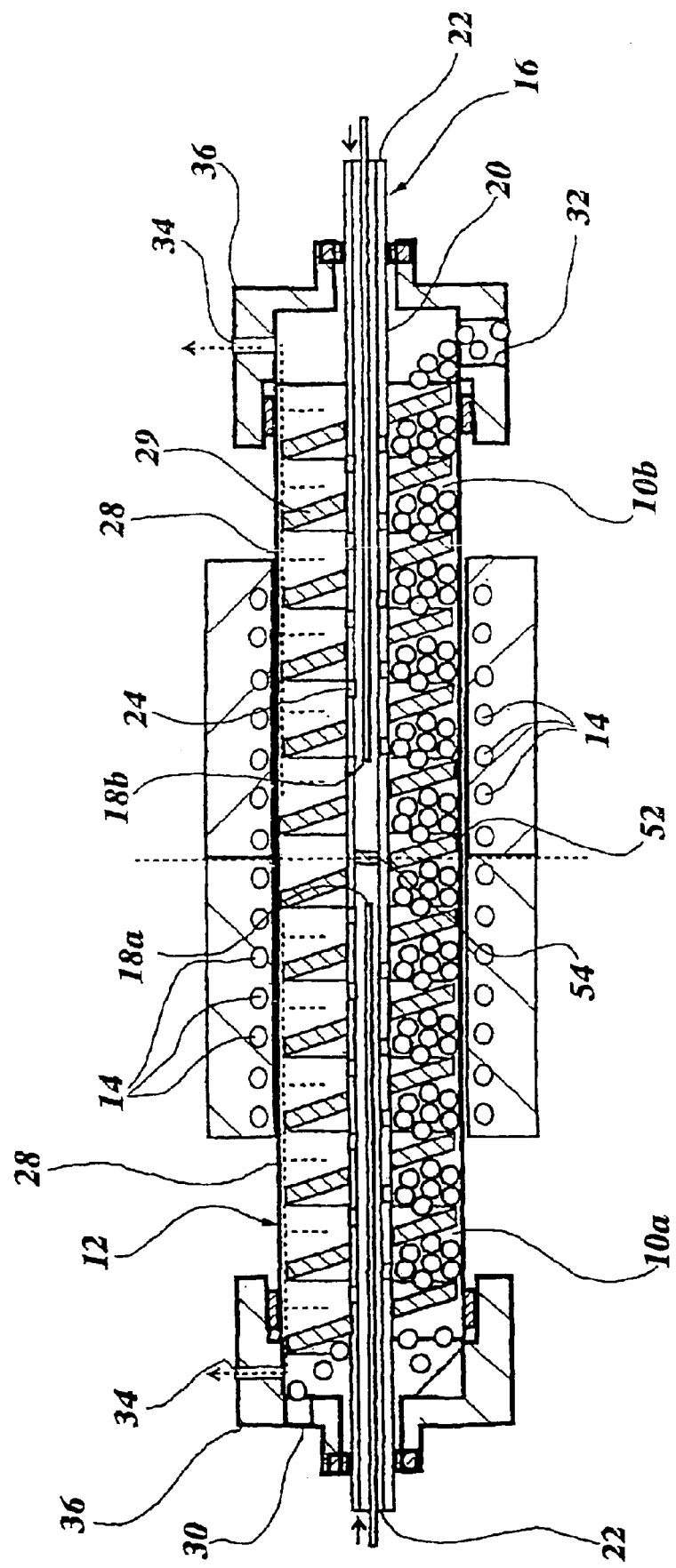
Figure 7:
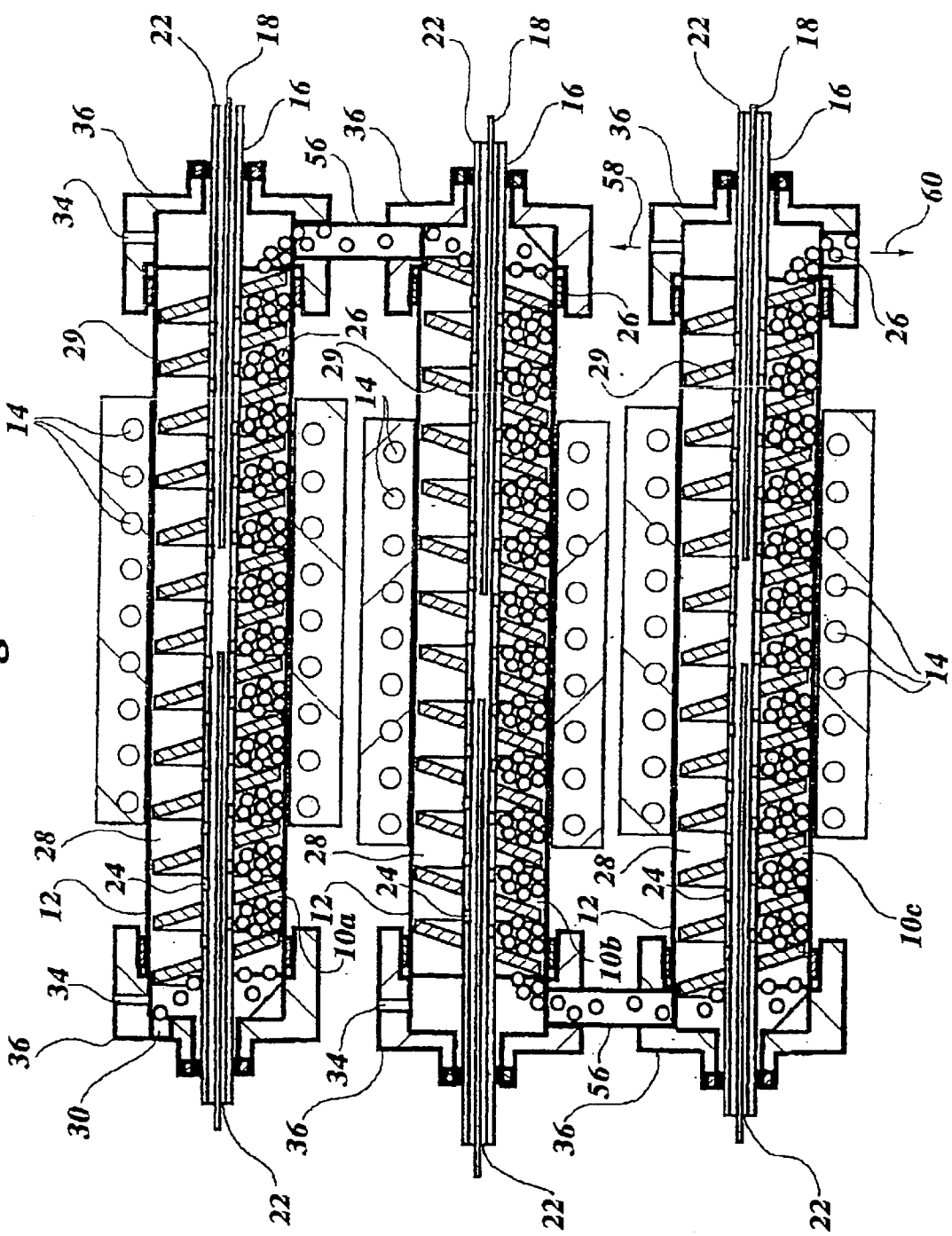

Advantages and characteristics of the present invention will be apparent from the following detailed description, given by way of non-limiting example with reference to the appended drawings, in which:

FIG. 1 is a schematic view of a first embodiment of a plant according to the invention, FIG. 2 is a schematic view of a second embodiment of a plant according to the invention, FIG. 3 is a sectional view according to line III—III of FIG. 2, FIG. 4 is a schematic view of a third embodiment of a plant according to the invention, FIG. 5 is a sectional view according to line V—V of FIG. 4, FIG. 6 is a schematic view of a fourth embodiment of a plant according to the invention, and FIG. 7 is a schematic view of a fifth embodiment of a plant according to the invention.

A plant for the thermal treatment of material, in particular the pyrolysis of scrap material, comprises (FIG. 1) a reaction zone 10 within a gas-tight rotary cylindrical kiln 12 having substantially horizontal axis and provided of first heating means 14, such as electrical resistors, around its mantle.

A screw 16 is rotary mounted within the kiln 12, along the longitudinal axis thereof. The screw shaft 20 is hollow and is provided, within its internal cavity, of second heating means 18, such as electrical resistors. Furthermore the shaft 20 is provided, at its ends, of openings 22 for entry of a gas, e.g. a purge gas such as methane, nitrogen or hydrogen, and, on its surface, of a plurality of porous sintered plates or inlays 24 of metal or ceramics, which allow the entry of the gas into the reaction zone 10. Alternatively such gas could be a comburent, such as oxygen, in case combustion reactions were desired. Still alternatively, the openings 22 and porous plates 24 could be used for suction from the reaction zone 10 in order to perform under vacuum treatments within the kiln 12.

A plurality of thermally conductive particles is movable within the reaction zone 10. Such particles are preferably spheres 26, e.g. of metal, ceramics or SiC, and may have a functionalised, e.g. catalytic, surface.

A radial clearance 28 shorter than the diameter of the spheres is present between the crest of screw thread 29 and the inner surface of the wall of the kiln 12.

The kiln 12 is further provided of an opening 30 for the entry of the spheres and the materials to be processed, a further opening 32 for the exit thereof, and openings 34 for the exit of gaseous substances. Alternatively, separate openings for the entry of the spheres 26 and the materials to be processed could be provided. Furthermore the kiln 12 and the associated screw 16 are provided of gas tight mountings 36 with devices, such as telescopic sealing systems, which are able to compensate the differential thermal elongation.

The materials (not illustrated, for clarity's sake, in the drawings) processable by the just described plant may be of various kinds: e.g. rubber, elastomers, tires, thermoplastics, duroplastics, soils, contaminated soils, compound materials, electronic scrap shredder fractions from industry and households containing polymer materials and halogenated compounds, biomass, straw wood, contaminated woods, carbon fibre composites and mixtures thereof. Also the consistence of such materials may be various: e.g. sticky or non-sticky materials, viscous and high viscous material with high tenor of metal and/or inert components, compound materials, powders, moist materials, particulate materials and mixtures of materials of different consistencies.

During operation a feed of material mixed with the spheres 26 is fed into the kiln 12 through the opening 30. In the alternative the material to be processed and the spheres 26 could be fed through distinct openings. The presence of the first and second heating means 14, 18 as well as of the thermally conductive spheres 26 allows to obtain a substantially homogeneous temperature, e.g. about 330° C., throughout both the cross section of the kiln 12 and the longitudinal axis thereof, which homogeneity is critical in order that e.g. only the desired chemical reactions of pyrolysis and dehalogenation take place.

Catalysts and/or scavengers—such as e.g. CaO, $CaCO_3$, sodium silicates and bases in general—suitable for obtaining a further reduction of halogens and halogenated fraction in the final product may be added to the materials to be processed.

Due to the rotation of the screw 16, the spheres 26 are pushed forward and clean the internal wall of the kiln 12, as well as the plates 24, from sticky material, even if the clearance 28 prevents the scraping of such internal wall by the crest of the screw thread 29. The clearance 28 provides the advantage of allowing the escape of the purge gas, as well as of the gaseous reaction products such as HCl, towards the openings 34. This feature avoids that possibly undesired consecutive reactions take place in the gaseous phase.

The screw 16 can be driven separately from the kiln 12, so as, using e.g. inverse rotation directions of kiln 12 and screw 16, it is possible to obtain long retention times coupled with good mixing.

The processed material together with spheres 26 exit from the kiln 12 trough opening 32. The spheres 26 can then be separated and recycled according to technologies well known to the skilled in the art, whereas the processed material, which has been deprived of almost the entire noxious halogen fraction, i.e. decontaminated and detoxified, may be subjected to further treatments.

FIGS. 2 and 3 illustrate a further embodiment of plant according to the invention, wherein the screw 16 is mounted off-center with regard to the axis of the kiln 12 and closer to the bottom thereof. Consequently the clearance 28 has its minimal width at its bottom portion, wherein it is shorter than the diameter of the spheres 26. The remaining structural features of the plant and the operation thereof correspond to the one illustrated with reference to FIG. 1.

FIGS. 4 and 5 illustrate a further embodiment of plant according to the invention, which additionally comprises means for allowing the direct recycling of the spheres 26 without exiting from the kiln 12. In particular the inner cavity of the screw shaft 20 is provided of openings 38, 40 for the radial entry and exit, respectively of the spheres 26. The exit opening 40 communicates with a first chamber 42 upstream the reaction zone 10, whereas the entry opening 38 communicates with a second chamber 44 downstream the reaction zone 10 and whose bottom is closed by a grid 46. A device shaped as a rail 48 is located within the chamber 44 and allows the guiding of the spheres 26 towards the entry openings 38. The extremities of the cavity within the screw shaft 20 are closed by respective plugs 50, which may be removed in order to allow to replace possibly damaged spheres 26. Furthermore the removal of plugs 50 may allow the outer recycling of spheres 26.

During operation, the spheres 26 fall from the inner cavity of the shaft 20 through the openings 40 in the first chamber 42 and are led by the rotation of the screw 16 in the reaction zone 10. At the end of this latter, the spheres 26 enter into the second chamber 44, wherein they are kept by the grid 46, whereas the residue of processed material can fall therethrough. The spheres 26 are guided by the device 48 towards the openings 38, so as they can reenter into the inner cavity of the shaft 20, from which they can be discharged again through the openings 40 and so on. Accordingly it is obtained a considerable energy saving, since the thermal energy of the spheres 26 is not wasted, but reutilized with continuity.

FIG. 6 discloses a further embodiment of plant according to the invention, wherein a cascade of two reaction zones 10a, 10b is formed by successive portions of the same rotary kiln 12. Such zones 10a, 10b are separated by an intermediate portion 52 of the kiln 12, wherein the crest of the screw thread 29 is substantially adjacent to the inner surface of the wall of the kiln 12. In this case the screw 16 is centered along the longitudinal axis of the kiln 12. Furthermore the internal cavity within the screw 16 is divided by a plate 54 in two separate sub-cavities provided of respective independent second heating means 18a, 18b, whereas the first heating means 14 are independently adjustable in correspondence of the two zones 10a, 10b.

Accordingly, a different thermal profile may be established in the two reaction zones 10a, 10b by suitable adjustment of the heating means 14, 18a, 18b. Therefore the dehalogenated materials arriving from the first zone 10a—having substantially the same function as the entire kiln 12 illustrated in FIG. 1—may be e.g. subjected to a higher temperature, such as about 380° C., in order to produce by pyrolysis monomeric compounds, such as styrene, which exit at the gaseous state from opening 34 and may be used as raw materials in further industrial processes.

FIG. 7 discloses a further embodiment of plant according to the invention, wherein a cascade of three reaction zones 10a, 10b, 10c is formed by respective separate kilns 12 which are serially connected by respective devices 56—e.g. in the form of tubes—allowing the transfer of materials exiting from an upstream kiln 12 as feed of a downstream one. The screws 16 are illustrated as mounted along the longitudinal axes of the respective kilns 12, but they could as well be mounted off-center with regard to these latter.

Furthermore, the kilns 12 could be provided of devices for the recycling of the spheres 26, such as the one illustrated in the FIGS. 4 and 5.

As a matter of fact, the same process treatments as in the first and second reaction zones 10a, 10b of the plant illustrated in FIG. 6 may take place in the first two kilns 12, respectively, whereas the processed materials are subjected in the third kiln 12 to a still higher temperature, e.g. of about 440° C.

Accordingly, the reaction zone 10c defined within the third kiln 12 produces a gaseous aliphatic fraction (see arrow 58) and a residue (see arrow 60) substantially free from noxious compounds and containing, depending on the quality of the feed, noble and/or iron and/or non-iron metals. These latter may be suitably and cheaply recovered, since they are now already separated from the most of materials of different nature.

Some non-limitative examples of thermal treatment by the use of the above plants are disclosed in the following.

EXAMPLE 1

A fraction of monitors and housings of computers and computer towers without circuit boards, or large metal pieces having a chlorine and bromine content of 2.4 wt. % in total, low metal content and mainly duroplastics like unsaturated polyesters and epoxy resins as polymer fraction, is pyrolysed in one stage at a temperature of about 400° C. in a plant with a processing type comparable to the one disclosed in respect of the plant illustrated in FIG. 1, using nitrogen as inert stripping gas. No halogen scavenging agents are added to the processed materials.

A significant amount of oxygen and phenols are generated during the pyrolysis due to the presence of epoxy and phenolic resins.

In spite of these unfavorable operation conditions, it is obtained an oil product with a surprisingly low level of halogenated compounds, such as chlorinated biphenyls PCBs, dioxins PCCDs and furans PCDF. By the use of a detection method for determination of PCBs, PCCDs and PCDFs such as the one disclosed in USEPA 8280A, 8290, it is detected the presence of only 1 mg/g of PCBs.

EXAMPLE 2

The same starting materials considered in example 1 are subjected to a two-step pyrolysis treatment in a plant comparable with the ones of the type illustrated in FIG. 6, at temperatures of about 330° C. and 400° C. respectively. The process allows to obtain out of headspace phase of the first reaction zone a low amount of a first product comprising oil with high halogen content (>2 wt. %) and out of the headspace phase of the second reaction zone a high amount of a second product comprising oil with low halogen content (0.002–0.2 wt %). The first product is suitably processed in an oxidative counter-flow unit of the type disclosed in U.S. Pat. No. 6,100,440, the content of which is herewith incorporated by reference. The second product is suitably processed with a dehalogenating agent, such as an alkaline or alkaline-earth metal, a polyalkile-neglycol, a Nixolens (registered trademark), an hydroxide or a $C_1$–$C_6$ alcoholate of an alkaline or alkaline-earth metal, as disclosed in EP-A-675 748, the content of which is herewith incorporated by reference. Both processed products have a very low halogen content, such as lower than 0.0002 wt. %, and may be used e.g. for generation of electricity or distillation for monomer recovery.

EXAMPLE 3

The oil product of example 1 is treated with the dehalogenating agents disclosed in EP-A-675 748 to convert the remaining halogenated compounds into organics and inorganic halogen salts. These latter are then precipitated by using $AgNO_3$, obtaining a final oil product with a halogen content <0.0002 wt. %. Such final product can be used for the generation of electricity, which is used e.g. for the heating of the plant and an electrolysis treatment for the recovery of the precipitated Ag, so as the whole process is energetically self-sustained.

Naturally, the principle of the invention remaining the same, the details of construction and forms of embodiment may be varied widely with respect to those described purely by way of example, without thereby departing from its scope. In particular the longitudinal axis of the kiln(s) is not necessarily horizontal, but may be inclined until ±45°, preferably until ±15°, with regard to an horizontal plane.

What is claimed is:

1. A plant for the thermal treatment of material, comprising at least one reaction zone within a rotary kiln having a longitudinal axis inclined of an angle in the range 0°+45° with regard to a horizontal plane and provided of first heating means and of at least a rotary screw having second heating means, the screw shaft being hollow and having, at least locally, apertures allowing the flow of gas from and/or into the reaction zone, a plurality of thermally conductive particles being movable within the reaction zone.

2. Plant according to claim 1, wherein said particles are spheres.

3. Plant according to claim 1, wherein said particles are formed of a material comprising metal, ceramics and/or SiC.

4. Plant according to claim 1, wherein said particles have a functionalised surface.

5. Plant according to claim 1, wherein the longitudinal axis of the kiln is inclined of an angle in the range 0°+15° with regard to the horizontal plane.

6. Plant according to claim 5 wherein the longitudinal axis of the kiln is substantially horizontal.

7. Plant according to claim 1, wherein the screw is mounted off-center with regard to the longitudinal axis of the kiln and closer to a bottom of the kiln.

8. Plant according to claim 7, wherein a radial clearance, which is at least in its bottom portion shorter than the diameter of the spheres, is present in said reaction zone between a crest of a screw thread of the screw and an inner surface of a wall of the kiln.

9. Plant according to claim 1, wherein the screw is mounted along the longitudinal axis of the kiln.

10. Plant according to claim 9, wherein a radial clearance, which is at least in its bottom portion shorter than the diameter of the spheres, is present in said reaction zone between a crest of a screw thread of the screw and an inner surface of a wall of the kiln.

11. Plant according to claim 1, wherein a radial clearance, which is at least in its bottom portion shorter than the diameter of the spheres, is present in said reaction zone between a crest of a screw thread of the screw and an inner surface of a wall of the kiln.

12. Plant according to claim 1, further comprising means for recycling said thermally conductive particles.

13. Plant according to claim 12, wherein said means for recycling comprise at least one respective opening for radial exit and entry of the particles from and into an inner cavity of the screw shaft, respectively, the exit opening communicating with a first chamber upstream the reaction zone, the entry opening communicating with a second chamber downstream the reaction zone, in which second chamber a device for guiding said particles towards the entry opening is located.

14. Plant according to claim 1, wherein said screw shaft is provided on its surface of a plurality of porous sintered plates or inlays, which allow the passage of the gas.

15. Plant according to claim 1, wherein said at least one reaction zone comprises a cascade of reaction zones.

16. Plant according to claim 15, wherein said reaction zones are formed by successive portions of the same rotary kiln, which are separated by respective intermediate portions of the kiln, wherein the crest of the screw thread is substantially adjacent to an inner surface of a wall of the kiln.

17. Plant according to claim 15, wherein said reaction zones are formed within separate kilns which are serially connected by respective devices, allowing the transfer of materials exiting from an upstream kiln as feed of a downstream one.

18. Plant according to claim 1 wherein the material that is processed is scrap material.

19. A plant for the thermal treatment of material, comprising:
    a rotary kiln having a longitudinal axis inclined at an angle in the range of 0° to ±45° from a horizontal plane, the kiln forming a first reaction zone therein;
    a first heater disposed about at least a portion of the kiln for providing heat to the reaction zone;
    a screw disposed in the kiln and capable of rotary motion relative to the kiln, the screw including a hollow screw shaft and apertures formed in the shaft for enabling gas communication therethrough;
    a second heater in communication with the screw shaft; and
    a plurality of thermally conductive particles disposed in the kiln, said particles being movable within the reaction zone by the relative rotary motion of the screw.

20. Plant according to claim 19, wherein said particles are spheres.

21. Plant according to claim 19, wherein said particles are formed of a material comprising metal, ceramics and/or SiC.

22. Plant to claim 19, wherein said particles have a functionalized surface.

23. Plant according to claim 19, wherein the longitudinal axis of the kiln is inclined of an angle in the range 0°+15° with regard to the horizontal plane.

24. Plant according to claim 19, wherein the screw is mounted off-center with regard to the longitudinal axis of the kiln and closer to a bottom of the kiln.

25. Plant according to claim 19, wherein the screw is mounted along the longitudinal axis of the kiln.

26. Plant according to claim 19, wherein a radial clearance, which is at least in its bottom portion shorter than the diameter of the spheres, is present in said reaction zone between a crest of a screw thread of the screw and an inner surface of a wall of the kiln.

27. Plant according to claim 19, further including means for recycling said thermally conductive particles.

28. Plant according to claim 19, wherein the screw shaft includes an entry opening formed therein for receiving particles in a cavity in the screw shaft and an exit opening formed therein for enabling particles to exit from the screw shaft cavity, the entry opening communicating with a downstream side of the kiln, the exit opening communicating with an upstream side of the kiln, whereby particles may be recycled from the downstream end to the upstream end.

29. Plant according to claim 23, wherein the kiln has a first chamber upstream from the reaction zone and a second chamber downstream of the reaction zone, the shaft exit opening communicating with the first chamber, the shaft entry opening communicating with the second chamber.

30. Plant according to claim 29, further comprising a rail disposed in the second chamber for moving particles into the screw shaft via the entry opening.

31. Plant according to claim 30 further comprising a grid through which products of the reaction zone pass and on which the particles are retained, thereby enabling the rail to move the particles to the screw shaft entry opening.

32. Plant according claim 19, wherein said screw shaft includes a plurality of porous sintered plates or inlays formed on a surface of the screw shaft, said sintered plates or inlays allowing passage the gas therethrough.

33. Plant according claim 19, further comprising at least one additional reaction zone disposed in the kiln, thereby forming a cascade of reaction zones.

34. Plant according to claim 19, wherein said rotary kiln is a first rotary kiln that is in series with a second rotary kiln such that the second rotary kiln receives the products from the first rotary kiln for further processing, the second rotary kiln including a screw having a screw thread, a crest of the screw thread is substantially adjacent to an inner surface of a wall of the second kiln.

35. Plant according to claim 19, comprising a third rotary kiln in with the second rotary kiln such that the third rotary kiln receives the products from the second rotary kiln for further processing.

36. A process for thermal treatment of scrap materials, the method comprising the steps of:

providing a rotary kiln having a kiln wall and a longitudinal axis inclined at an angle in the range of 0° to ±45° from a horizontal plane, the kiln forming a first reaction zone therein; a first heater disposed about at least a portion of the kiln for providing heat to the reaction zone; a screw disposed in the kiln wall and capable of rotary motion relative to the kiln, the screw including a hollow screw shaft and apertures formed in the shaft for enabling gas communication therethrough; a second heater in communication with the screw shaft; and a plurality of thermally conductive particles disposed in the kiln, said particles being movable within the reaction zone by the relative rotary motion of the screw;

feeding scrap materials into the rotary kiln;

moving the scrap material and particles through the reaction zone in the kiln by relative rotary motion between the screw and the kiln; and heating an interior portion of the screw with a first heater and heating at least a portion of the reaction zone with a second heater, whereby the scrap materials are thermally treated.

37. The process according to claim 36 wherein the scrap materials are pyrolyzed in the reaction zone.

38. The process according to claim 36, wherein gas moves through the kiln counter-flow to the movement of the scrap material.

39. The process according to claim 38, wherein the scrap materials are subjected to oxidative counter-flow dehalogenation.

40. The process according to claim 36, wherein the scrap materials are subjected to a treatment with a dehalogenating agent.

41. The process according to claim 40, wherein the dehalogenating agent is selected from a group consisting of an alkaline or alkaline-earth metal, a polyalkileneglycol, an hydroxide, and a $C_1$–$C_6$ alcoholate of an alkaline or alkaline-earth metal.

42. The process according to claim 36, wherein catalysts and/or scavengers are used for obtaining a reduction of halogens and halogenated fraction in the final product.

43. The process according to claim 36, wherein the particles are recycled from an outlet of the kiln to an inlet of the kiln through the hollow screw.

44. The process according to claim 36, wherein gas passes from an interior of the screw into the reaction zone.

* * * * *